US009195757B2

(12) United States Patent
Portnoy et al.

(10) Patent No.: US 9,195,757 B2
(45) Date of Patent: Nov. 24, 2015

(54) DYNAMIC DIGITAL MONTAGE

(75) Inventors: William Portnoy, Woodinville, WA (US); Richard Zaragoza, Issaquah, WA (US); Matthew Bret MacLaurin, Woodinville, WA (US); Craig Jensen, Sammamish, WA (US); Richard Daniel Marshall, Lynwood, WA (US); Bradley Gibson, Woodinville, WA (US); Tom Laird-McConnell, Kirkland, WA (US); Steve Ickman, Snoqualmie, WA (US); David Raskino, Kirkland, WA (US); Lili Cheng, Bellevue, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 540 days.

(21) Appl. No.: 13/098,486

(22) Filed: May 2, 2011

(65) Prior Publication Data

US 2012/0284245 A1    Nov. 8, 2012

(51) Int. Cl.
G06F 17/00 (2006.01)
G06F 17/30 (2006.01)
G06Q 30/02 (2012.01)

(52) U.S. Cl.
CPC .......... *G06F 17/30867* (2013.01); *G06Q 30/02* (2013.01)

(58) Field of Classification Search
CPC .................. G06F 17/30893; G06F 17/30643; G06F 17/30864; H04N 21/4826; H04N 21/4668; H04N 21/4622
USPC ........................................................ 707/706
See application file for complete search history.

(56) References Cited

U.S. PATENT DOCUMENTS

| 7,249,123 | B2 | 7/2007 | Elder et al. |
| 7,676,505 | B2* | 3/2010 | Chess et al. ............ 707/999.203 |
| 2004/0098360 | A1* | 5/2004 | Witwer et al. .................... 707/1 |
| 2006/0112111 | A1 | 5/2006 | Tseng et al. |
| 2006/0282303 | A1 | 12/2006 | Hale et al. |
| 2007/0276676 | A1 | 11/2007 | Hoenig et al. |
| 2008/0005072 | A1 | 1/2008 | Meek et al. |
| 2009/0094525 | A1* | 4/2009 | Coelius et al. ................ 715/741 |
| 2010/0205541 | A1 | 8/2010 | Rapaport et al. |

(Continued)

OTHER PUBLICATIONS

Kiciman, Emre., "Implicit Search of Social Network Data to Discover Collaborative Search Opportunities", Retrieved at << http://workshops.fxpal.com/cscw2010cis/submissions/tmp26.pdf >>, 2010, pp. 4.

(Continued)

*Primary Examiner* — Yicun Wu
(74) *Attorney, Agent, or Firm* — Steve Wight; Sandy Swain; Micky Minhas

(57) ABSTRACT

A dynamic digital montage system assists a user in creating and publishing a montage about one or more specified topics. The system receives an identification of one or more topics of interest from the user, and based on the subject information, collects data from dynamic and static data sources for display in dedicated sections of a montage. The data is presented in one of a number of predefined but editable layouts for presentation to a user. In one implementation, at least one of the montage components is associated with a dynamic data source and is updated when new data is provided by the dynamic data source. In another implementation, the data sources attached to the montage components are analyzed on a periodic basis, and based on the analysis, data source assignments and/or the montage layout is revised.

21 Claims, 7 Drawing Sheets

(56) References Cited

U.S. PATENT DOCUMENTS

| | | | |
|---|---|---|---|
| 2010/0217641 A1* | 8/2010 | Siegel | 705/8 |
| 2010/0299325 A1* | 11/2010 | Tzvi et al. | 707/728 |
| 2010/0325107 A1 | 12/2010 | Kenton et al. | |
| 2011/0016407 A1* | 1/2011 | Nelson | 715/742 |
| 2011/0202557 A1* | 8/2011 | Atsmon et al. | 707/769 |

OTHER PUBLICATIONS

Mislove, et al., "Exploiting Social Networks for Internet Search", Retrieved at << http://www.mpi-sws.org/~gummadi/papers/mislove06exploiting.pdf >>, In Proceedings of the 5th Workshop on Hot Topics in Networks, 2006, pp. 79-84.

* cited by examiner

DYNAMIC DIGITAL MONTAGE

BACKGROUND

The development of the World Wide Web (the "Web"), web search engines, and social networking services has resulted in the generation and collection of vast quantities of information. Such information is often presented to Web users through a number of websites that display the information on substantially static or slowly evolving Web pages and update those Web pages at various intervals (e.g., weekly, daily, hourly). Examples of such static data sources include numerous newspaper websites, news network websites, magazine publisher websites, industry press websites, etc. However, while some Web pages are updated by their publishers more frequently than others, the sources and frequency of such updates are typically limited (e.g., an editor posts a new article on the Web page one or twice a day).

On the other hand, a vast amount of online information is also generated and presented through dynamic data sources, including without limitation various RSS feeds, blogs, micro-blogs, forums, chat rooms, etc., which tend to provide information of a more current, asynchronous, and rapidly changing nature. For example, a blogger may post an article on his or her blog at the beginning of the day and then, throughout the day and into the future, others are posting comments to the article in the article's comments section. In addition, dynamic data sources often provide such information automatically or semi-automatically as the information is published by various authors, commenters, and information services, rather than merely being posted manually to a static Web page by an editor on a periodic basis. For example, online comments and discussions about a snowstorm, uploaded images and videos of the snowstorm, etc. are automatically aggregated and re-published frequently through various social media channels in the hours before, during and after the snowstorm. In contrast, static Web pages, such as pages on a website for the city experiencing the snowstorm, tend not to capture in near-real-time the surge of interest about the snow storm that is captured by the dynamic data sources.

Furthermore, the relevancy of information to users may diminish quickly as the subject matter becomes less current. For example, user interest about the snowstorm information wanes after the snowstorm has ended, and as such, if such information were captured on static Web pages, the relevance of the information from static data sources to users will also diminish over time. In contrast, the temporally-less-relevant information from dynamic data sources typically gives way to new information about more relevant topics as time progresses. Accordingly, information generated by such dynamic, or "trending," data sources tends to appear and then recede into the background very quickly so that the most relevant information is more prominent and readily accessible. Thus, dynamic data sources provide a relevancy advantage over substantially unchanging and stale static data sources.

SUMMARY

Implementations described and claimed herein address the foregoing problems by providing a dynamic digital montage system. The dynamic digital montage system disclosed herein assists a user in creating and publishing a montage about one or more specified topics. The system receives an identification of one or more topics of interest from the user, and based on the subject information, collects data from dynamic and static data sources for display in dedicated sections of a montage. The data is presented in one of a number of predefined but editable layouts for presentation to a user. Each predefined layout includes multiple montage components, wherein an editor engine allows the user to select the montage components to be included in and/or omitted from the montage, to identify one or more data sources that provide information related to topics of user interest, to assign the one or data sources to the one or more montage components, and to display data received from the data source through the assigned montage component. In one implementation, at least one of the montage components is associated with a dynamic data source and is updated when new data is provided by the dynamic data source. In another implementation, the data sources attached to the montage components are analyzed on a periodic basis and, based on the analysis, data source assignments and/or the montage layout are revised.

In some implementations, articles of manufacture are provided as computer program products. One implementation of a computer program product provides a tangible computer program storage medium readable by a computing system and encoding a processor-executable program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

In one or more implementations, a dynamic digital montage system enables users to curate information from one or more dynamic data sources into customized layouts on one or more specified topics. In addition to including data from static data sources (e.g., substantially or slowly changing Web pages), a dynamic digital montage also incorporates near-real-time updated data from dynamic data sources, such as blogs, micro-blogs, social networking websites, search results, etc. In one implementation, a dynamic digital montage also includes rich media, such as photographs, online videos, etc., from both static and dynamic data sources. Such dynamic digital montages can be created by a single user or by a community of users, wherein the members of the community add comments, tags, rankings, etc. Community curation also allows the community members to redesign the layout, to re-mix the sources, etc. Users can also use a dynamic digital montage created by other users as a template and redesign it to generate their own dynamic digital montages. Attribution to the original author can be provided by the deriving user within the deriving user's montage, thereby providing historical continuity as dynamic digital montages evolve.

Figure 1:
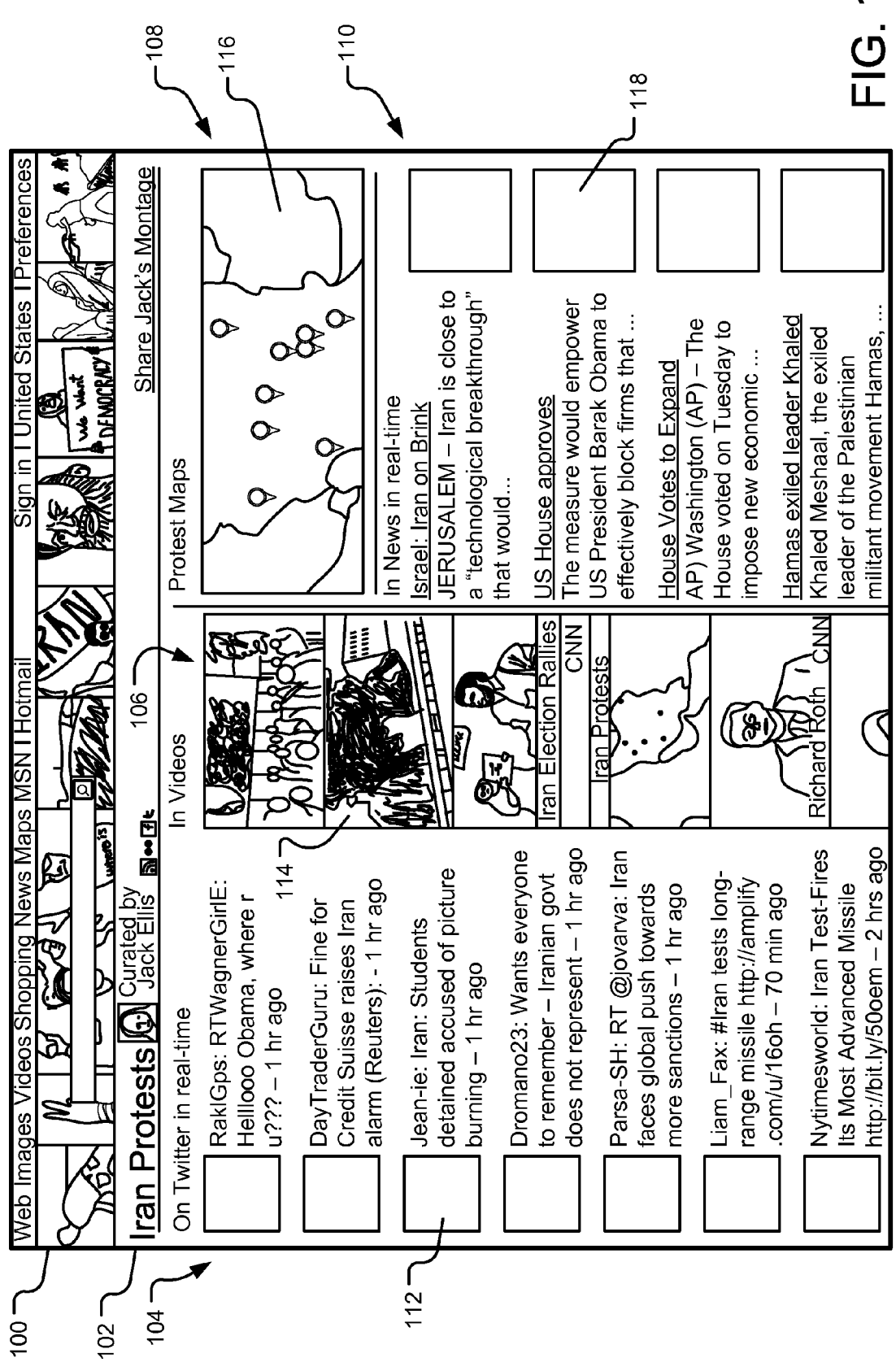
FIG. 1 illustrates an example dynamic digital montage user interface.

FIG. 1 illustrates an example dynamic digital montage user interface 100. As indicated at title bar 102, the dynamic digital montage shown in the user interface 100 is based on the specified topic of "Iran Protests." An individual by the name of "Jack Ellis" has collected, organized, and maintained the dynamic digital montage, acting as a curator for an assembly of data presented in the montage. Badges providing links to various publication and social media services are displayed to the right of the curator's identification, and on the far right, the montage provides a link to share this montage with others (e.g., allowing the current user to publish the montage or a link to the montage to his or her friends).

The montage shown in FIG. 1 presents an assembly of four distinct montage components: a Twitter® montage component 104, a video montage component 106, a map montage component 108, and a news montage component 110. The video montage component 106 and the map montage component 108 present video and maps (pertaining to the topic "Iran Protests), respectively, as collected from substantially static data sources, such as Bing® Videos and Bing® Maps. In contrast, the Twitter® montage component 104 and the news montage component 110 present tweets and news articles (pertaining to the topic "Iran Protests), respectively, from dynamic data sources, such as a Twitter® feed and an MSN® RSS feed. Dynamic data sources provide a data stream that changes frequently, often because the data is collected asynchronously from multiple sources and provided into the data stream when received. The Twitter® montage component 104 includes avatars representing the authors of the tweets (see e.g., avatar 112). The video montage component includes a frame capture image of each associated video (such as image 114). The map montage component 108 includes a map 116 with markers indicating locations relevant to the specified topic. The news montage component 110 includes images (such as image 118) associated with the news article presented in the list.

The data displayed in the video montage component 106 and the map montage component 108 remains relatively static, because the underlying data sources are unchanging or slowly changing. In contrast, the data displayed in the Twitter® montage component 104 and the news montage component 110 refreshes frequently because the underlying dynamic data sources provide frequently changing data streams (e.g., the data stream provide a flow of new data as new data is available from the dynamic data source). Accordingly, the Twitter® montage component 104 and the news montage component 110 appears to scroll down the page as new content is added to the top of their respective lists during each refresh, such that the most current tweets and news articles are presented more prominently than the older items.

Figure 2:
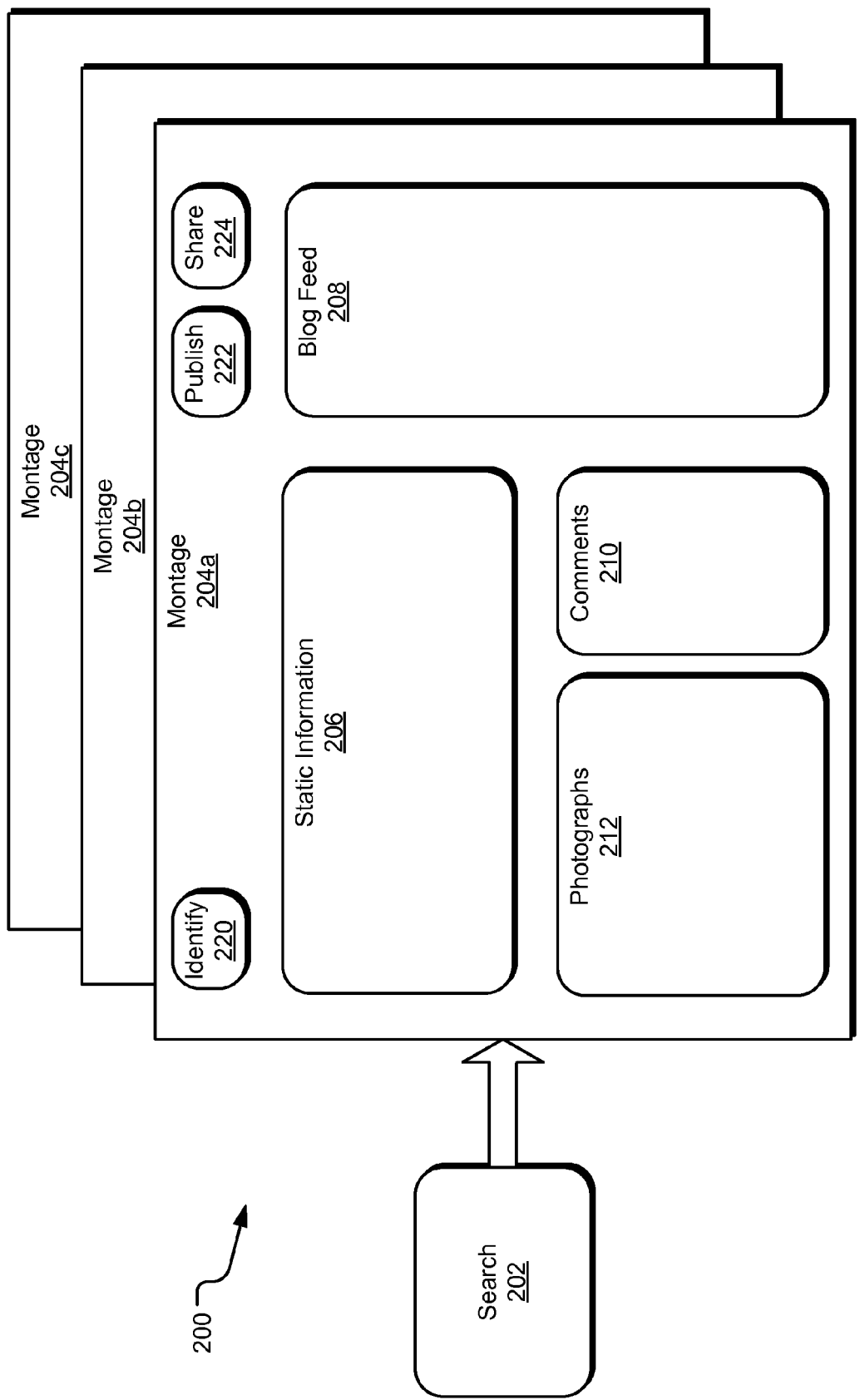
FIG. 2 illustrates an assembly of montage components in an example dynamic digital montage environment.

FIG. 2 illustrates an assembly of montage components in an example dynamic digital montage environment 200. A search engine 202 of the dynamic digital montage environment 200 receives a topic of interest from a user (e.g., through a user interface search field. For example, a user interested in creating a montage pertaining to micro-brewed beers in Seattle can enter "Micro-brewed beer Seattle" as the topic of interest (a "search topic"). The search engine 202 executes a search query based on the search topic and returns a variety of identified data sources determined to be relevant to the search topic. The data is provided to multiple montage components that display the data in distinct sections of the montage.

The search engine 202 can be executed on a variety of different devices. For example, a user can execute the search engine 202 as a local application or via a web browser on a workstation, a mobile device, set-top box, etc. In one implementation, a website that publishes montages for users may present a user interface that presents a search field to receive a user-provided topic of interest and a search control to trigger the associated search. Alternatively, the search engine 202 may be linked to one or more popular search engines. In one such implementation, the list of search results returned from an external search engine may present an option that allows the user to create a montage for that topic based on the search results.

In one implementation, the dynamic digital montage environment 200 selects from a number of predefined montages 204a, 204b, 204c, etc., (collectively referred to as the "montages 204") based on a specified search topic. In one implementation, in addition to the search topic, the selection of the montages 204 can also depend on a number of parameters related to the user, which the dynamic digital montage environment 200 determines from a user profile, historical search data, social network data, a user's location, etc. Furthermore, such information may be used to determine the relevance of certain data sources to the user and the specified search topic. For example, if there is a member of the user's social network who publishes a blog about micro-brewed beers in Seattle, one of the montages in the selection of montages 204 may use the blog as a dynamic data source.

In another implementation, the selection of montages 204 is based on one or more rankings of various predefined montage layouts or of fully authored montages. In such an implementation, the dynamic digital montage environment 200 keeps track of the usage, ratings, and/or popularity of various predefined montage layouts and montages. For example, the dynamic digital montage environment 200 can provide a feedback option to users/visitors of various montages to collect the popularity information, using such popularity information to rank the predefined montage layouts and montages. Alternatively, the dynamic digital montage environment 200 tracks other parameters related to montage layouts and montages, such as the number of authors choosing a particular montage layout, the number of visitors to an authored montage during a time period, the time spent by the visitors in viewing an authored montage, the number of links to an authored montage, etc., and uses the collected parameters to influence a ranking for the corresponding montage layout and/or authored montage. It should be understood, however, that a user may alternatively create and curate a dynamic digital montage from scratch, by adding montage components to a montage and assigning sections/locations of the montage, component types (e.g., video, blog, etc.), search topics and visual styles (e.g., scrolling, slideshow to the right, etc.) to the added montage components and then saving the montage.

In one implementation, the publisher of a derived montage may present an attribution to one or more authors from which the published montage is derived. For example, if Bob authors and publishes a montage that he derived from Jim's montage, Bob can include a field in his montage that identifies that his montage was derived from a montage authored by Jim. Such attribution may be stored as metadata in association with Bob's montage data and presented in the user interface displaying Bob's montage.

Each of the montages 204 includes one or more montage components. In one implementation, a montage component can be implemented as a section of a web page, a widget for a web page, a mark-up language element, one or more user interface controls, etc. Such montage components are presented to a user within the montage 204 in a graphical user interface (GUI) on a computing device. The displayable region of the montage 204 is termed "the montage view." Montage components in a montage 204 are attached to one or more data sources and present data received from such data sources. In one implementation, a montage component collects data from the data source using a "pull" mechanism, where the montage component requests data from the data source on a periodic basis. Alternatively, the data source "pushes" data to the montage component, such as when new data is published to the data source. In both scenarios, the new data is received by the montage component where the new data is refreshed in the display of the montage component. Furthermore, the montage component can present the data as received or analyzes and/or formats the data before the data is presented.

As illustrated in FIG. 2, a montage 204a includes montage components 206-212, each montage component allocated to a distinct section of the montage. A static information montage component 206 presents data from a static data source (i.e., a data source with unchanging or slowly changing data) about the topic indicated by the user, such as via a search field. For example, for the topic of "micro-brewed beer in Seattle," the static information montage component 206 collects one or more reports about various Seattle micro-breweries from static data sources (e.g., newspaper Web pages) and presents them on the montage 204a within the GUI of the static information montage component 206. In various implementations, the static data sources used by the static information montage component 206 include websites of local newspapers and periodicals, websites of local breweries, national newspapers, etc. The static information montage component 206 includes a scroll bar to allow a user to navigate within the GUI of the static information montage component 206.

In one implementation, the data presented by the static information montage component 206 is cached on a server supporting (e.g., serving) the dynamic digital montage environment 200. In such a case, even if a data source changes the information, the information presented by the static information montage component 206 remains the same until refreshed by the montage component 206. In an alternative implementation, the information presented by the static information montage component 206 is updated at pre-determined time intervals, which may be customized by the user.

The montage 204a also includes a blog feed montage component 208 that collects and presents blog data, RSS data, and/or micro-blog data, such as from a Twitter® feed, etc. Whereas the data presented by the static information montage component 206 is substantially static in nature, the data presented by the blog feed montage component 208 is relatively more dynamic. In other words, a substantial amount of the data presented by the blog feed montage component 208 is generated and displayed in real-time or near real-time. As a result, the blog feed montage component 208 presents the data in a dynamic format, such as a scrolling format, etc.

Furthermore, the blog feed montage component 208 can also analyze the presented blog data in real-time. For example, if the blog feed montage component 208 finds that a new micro-brewery has opened in Seattle, and due to that fact, a lot of users are blogging about this new brewery, the blog feed montage component 208 selects and collects data about the new brewery to display in the montage 204a. In an alternative implementation, if the blog feed montage component 208 finds that one or more of the acquaintances of the user of the montage 204a are currently blogging about a particular micro-brew, the blog feed montage component 208 selects and collects those blog entries to be displayed in the blog feed montage component 208. The blog feed montage component 208 also allows the user of the montage 204a to specify which blog sources are to be selected, which data sources are to be blocked, how often to update the data sources, etc. However, default settings for such parameters may also be set on a per-montage basis and applied by the montage 204a when it is presented to the user in response to the search using the search engine 202. Moreover, such default settings may be based on some heuristic data about past use of the blog feed montage component 208 by various users.

Another example montage component included in the montage 204a is a comments montage component 210. The comments montage component 210 allows users to add/collect comments to the montage 204a. A user can provide comments about the topic, layout, creator, publisher of the montage 204a, or any general comment. In one implementation, only the creator and publisher of the montage 204a are allowed to add comments using the comments montage component 210. However, in an alternative implementation, any visitor to the montage 204a is\may be granted access to add a comment through the comments montage component 210. Additionally, the comments montage component 210 also provides a filter option so that the types of comments for the montage 204a may be filtered. The creator or publisher of the montage 204a is able to restrict the identities, types, and number of users who can add comments. For example, the creator may allow only those users who are "friended" by the creator or publisher in a particular social network to be able to provide a comment.

Another montage component presented on the montage 204a is a photographs montage component 212 that presents various images related to the topic of the montage 204a. The images displayed by the photographs montage component 212 are collected from a number of data sources, such as local storage, server-attached storage, cloud storage, etc. A user can change, edit, and/or filter the photographs presented by the photographs montage component 212. Furthermore, just as with the comments montage component 210, the photographs montage component 212 also provides ability for the creator or publisher of the montage 204a, the creator's social network friends, the publisher's social network friends, other specifically authorized users, etc., to add photographs. Attribution to the authors of the added photographs may also be provided by the curator of the montage that includes the photographs montage component 212.

Other types of montage components include an online video montage component (not shown) that presents one or more online videos. The online music montage component may be configured to automatically start playing audio files as soon as the user activates the montage. Yet another example of a montage component is a scrolling display (not shown) at the top or bottom of the montage. For example, if a user has created a montage about a public company, a scrolling display at the bottom can provide scrolling stock price information.

In another implementation, an advertising montage component (not shown) is also provided. For example, a user can select the advertisement montage component and select the type of advertisements that can be provided through that montage component. Alternatively, the user, creator, or publisher of a montage is provided an option for revenue sharing for any such advertisement placement. An example advertising montage component is clickable (e.g., selectable, actionable via a mouse click, etc.), transformable, and navigates a user to another website in response to selection by the user. Revenue from such navigations can be directed to the montage owner in a similar manner as a banner ad on a webpage. Furthermore, such revenue may be shared among the authors in an attribution tree. For example, if a montage is derived from one or more original montages authored by others and the montage includes attributions to these authors, the attribution information may include instructions on where to direct a portion of the revenue resulting from a navigation through an advertising montage component in the montage. As such, both the curator and the original authors of derived content and layout of the montage can be compensated for their efforts.

In one implementation, the layout of the montage components 206-212 on the montage 204a is predetermined by the dynamic digital montage environment 200 based on heuristics relating to a number of montages that are created and managed by the dynamic digital montage environment 200. However, a user is allowed to change the layout of the montage once the user selects to work with a specific layout. Alternatively, the layout of the montages 204 is changed dynamically, based on updated user behavior, etc.

When a user is presented with the montages 204 (such as in a gallery of predefined montages), the user can browse through the montages and select one of interest to the user. The browsing support facilitates the selection process for the user. In one implementation, as the user browses each of the various montages 204a-204c, the user can tag one or more montage components that the user is interested in using. Thus, for example, the user can select the static information montage component 206 from montage 204a, and a comments montage component 210b (not shown) from the montage 204b. Alternatively, one or more parameters related to one montage component from one montage can be used with another montage component from another montage. Thus, the user can select the layout of the static information montage component 206 from montage 204a and the data source from a static information montage component 206c (not shown) from the montage 204c.

In one implementation, as the user browses through the selection of montages 204, and as the user tags various montage components and parameters for the tagged montage components, such montage authoring information is saved by an authoring engine. The montage authoring information is presented to the user in a separate window. In one implementation, the user can save such montage authoring information for later use. Alternatively, the user can share the authoring information with other people and give them rights to edit the authoring information. The authoring information generated by a user can be converted into source code and published for wider set of users. However, in one implementation, the creator of such authoring information is allowed to restrict such public dissemination of authoring information.

Once a user has selected one or more of the montage components for inclusion in a custom montage, the user can resize the boundaries of each of such montage components using an editor engine. For example, a user can input edit commands through the GUI to drag and drop a montage component to move it around a montage, to drag and resize the boundaries of a montage component, to delete a montage component from a montage, to split a montage component into two montage components, etc. In one implementation, edit commands are entered via an in-browser editor GUI that is displayed when a user hovers over a montage component. For example, by hovering over a montage component, a user is presented with a translucent editing panel, offering vertical and horizontal splits of the montage region occupied by the montage component, deletion of the montage component, etc.

Once a user determines that he or she has completed editing a montage, the user can select an identification control 220 to provide information identifying the user. In response to the user's selection of the identification control 220, the dynamic digital montage environment 200 provides a pop-up menu for collecting user identifying information such as name, e-mail, etc. In one implementation, such a pop-up menu also provides the user with a selection of privacy choices.

Once the user is ready to publish a montage, the user selects a publish control 222 to publish the montage. Alternatively, if the user is merely interested in sharing the montage with a selected group of people (a type of limited publication), the user selects a share control 224 to share the montage. In such a case a pop-up menu is provided so that the user can specify the list of people who have access to the montage. In an alternative implementation, a predefined group of users, such as members of the user's social network, are automatically given access to the montage. In one implementation, each of the identification control 220, the publish control 222, and the share control 224 are accessible only to the creator of a montage and only during the editing mode. That is, once a montage is shared on published, these controls 220-224 will not be visible to the visitors of that montage.

Figure 3:
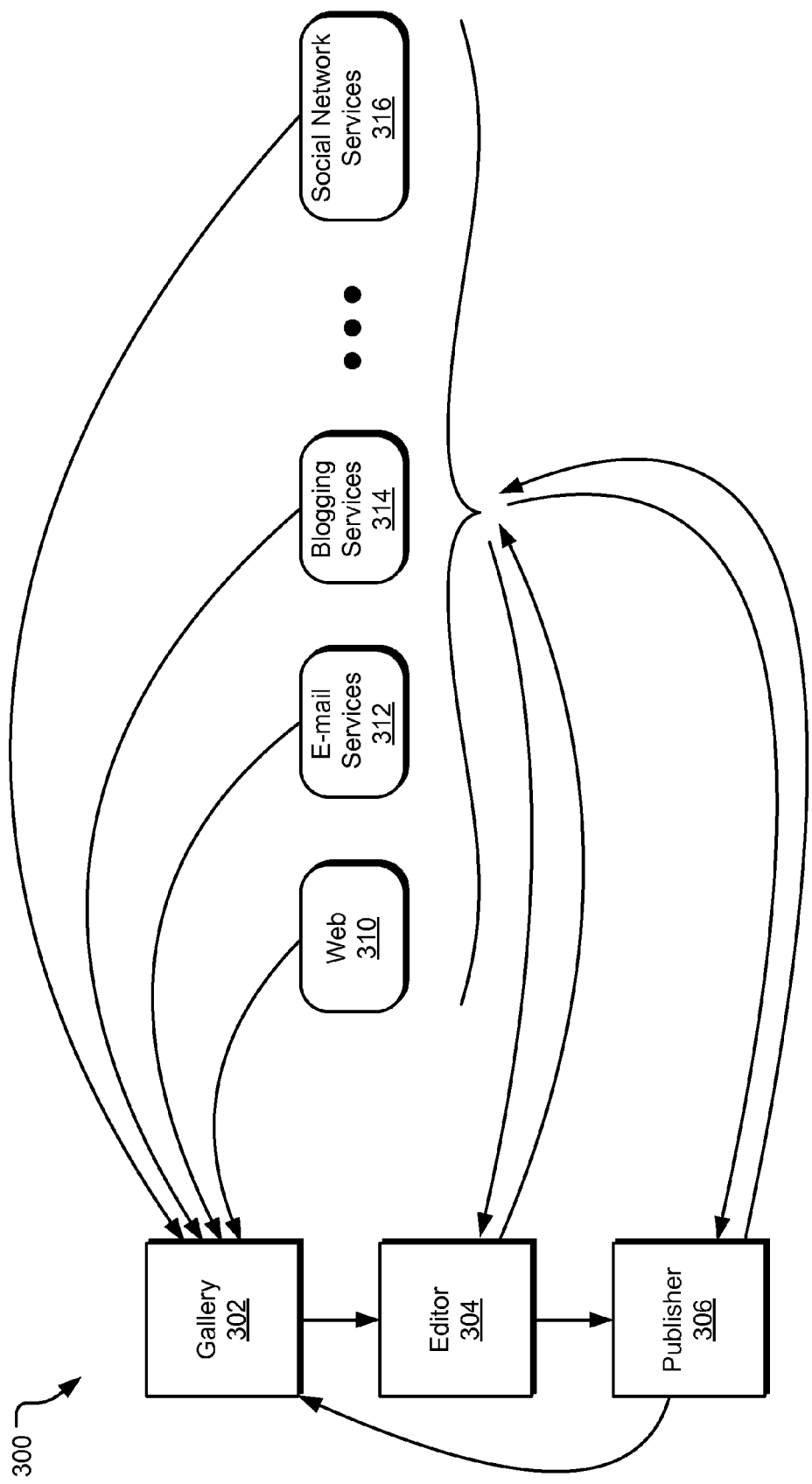
FIG. 3 illustrates example data sources and flows for a dynamic digital montage system.

FIG. 3 illustrates example data sources and flows for a dynamic digital montage system 300. The dynamic digital montage system 300 includes a gallery engine 302. In one implementation, the gallery engine 302 is hosted on a montage server that is communicatively connected to the Internet. Alternatively, one or more components of the gallery can be stored on a cloud computing system. The gallery engine 302 allows users to create montages, publish montages, collaborate on montage creation, view completed montages, etc. In one implementation, one or more montages of the gallery engine 302 are accessible to users by visiting a particular website and providing one or more search terms. For example, a user can visit a montage website and key in the phrase "Seattle Micro-brew" to get a list of existing montages related to that phrase. If no such montages exist, the list of montages presented to the user can include montages about micro-brews in Washington state, montages about micro-brews in general, montages about wineries in Washington, etc.

In one implementation, a link to access the gallery engine 202 is placed on results generated by a search engine. For example, when a user is searching for "Seattle beer," the results of the search include a link that invites the user to view various montages related to Seattle beers. The gallery engine 302 is communicatively connected to the Internet and to the Web 310. In an alternative implementation, the gallery engine 302 is communicatively connected to one or more e-mail services 312 that provide the gallery engine 302 access to e-mail data, to one or more blogging services 314, to one or more social network services 316, local storage (not shown), etc. Depending on the access rights provided to the gallery engine 302 by users, the gallery engine 302 accesses information from the various data sources 310-316 to update the information on the montages.

The gallery engine 302 is communicatively connected to an editor engine 304. In one implementation, the editor engine 2304 is hosted and implemented on the same server that also hosts and implements the gallery engine 302. However, in an alternative implementation, it is implemented on a separate server, on a cloud computing system, etc. The editor engine 304 stores the structural information about one or more montages on the gallery engine 302. For example, the editor engine 304 may include the source code required to publish the montages, the source code required to edit the montages, etc.

In one implementation, the editor engine 304 stores a number of predefined montage templates that can be used by a user to author his or her montage. Each montage template defines an editable layout of a montage. The editor engine 304 is adapted to update the montage templates on a periodic basis. In one implementation, the editor engine 304 updates the montage templates based on a ranking of the various montages from the gallery engine 302. The editor engine 304 also includes code for various montage editing service programs, which a user can employ by inputting edit command (e.g., delete, move, split section, change_topic, change_visual_style, change_component_type, etc.) through the GUI. For example, a user can select a montage or a combination of montages from the gallery engine 302 and use the editing service programs from the editor engine 304. An example of an editing service program provided by the editor engine 304 is a program that allows a user to change a data source attached to a montage component on a montage. Another example of an editing service program is a program that allows a user to change filter settings for an individual montage component on a montage or on an entire montage.

In one implementation, the editor engine 304 is communicatively coupled via a communications network to the Web 310, to e-mail services 312, to blogging services 314, to social network services 316, etc. The editor engine 304 also allows users to add additional programs that can be shared among other users to edit montages. For example, the editor engine 304 publishes information about one more application programming interfaces (APIs) for editing montages so that a user can add a new montage component or additional service that can be used by other montages. An example, of such a user provided API is a quiz montage component that can be added by the users on their montages, wherein the quiz montage component uses the data sources attached to a montage to generate dynamic quizzes for visitors to the montage.

The editor engine 304 is communicatively connected to a publisher engine 306. One or more service programs from the publisher engine 306 allow users to publish or share montages. A user accesses one or more of the service programs provided by the publisher engine 306 by selecting a Publish control or a Share control on a montage when creating the montage. The publisher engine 306 collects information about where the user wants to publish the montage and/or information about who is allowed to view the montage, etc. The publisher engine 306 is communicatively coupled via a communications network to the Web 310, to the e-mail services 312, to the blogging services 314, to the social network services 316, etc., and it receives information from one or more of these data sources 310-316 to refresh the montage display as the data is updated and received by the montage.

Once the publisher engine 306 publishes a montage created by a user, such montage becomes available through the gallery engine 302. The montage components of a montage published on the gallery engine 302 communicate via the Internet or other communication network with the Web 310, the e-mail services 312, the blogging services 314, the social network services 316, etc. In one implementation, one or more of the montage components in a montage include a pull engine that pulls data. Alternatively, each of the Web 310, the e-mail services 312, the blogging services 314, the social network services 316, etc., can push data to the appropriate montage components. Alternatively, the gallery engine 302 gathers requests from one or more of the montage components from various montages on the gallery engine 302 and communicates with appropriate data sources as necessary. Because some of the data sources attached to the gallery engine 302 are more dynamic than others, the frequency at which data is requested from such sources varies depending on the type of the data source.

Figure 4:
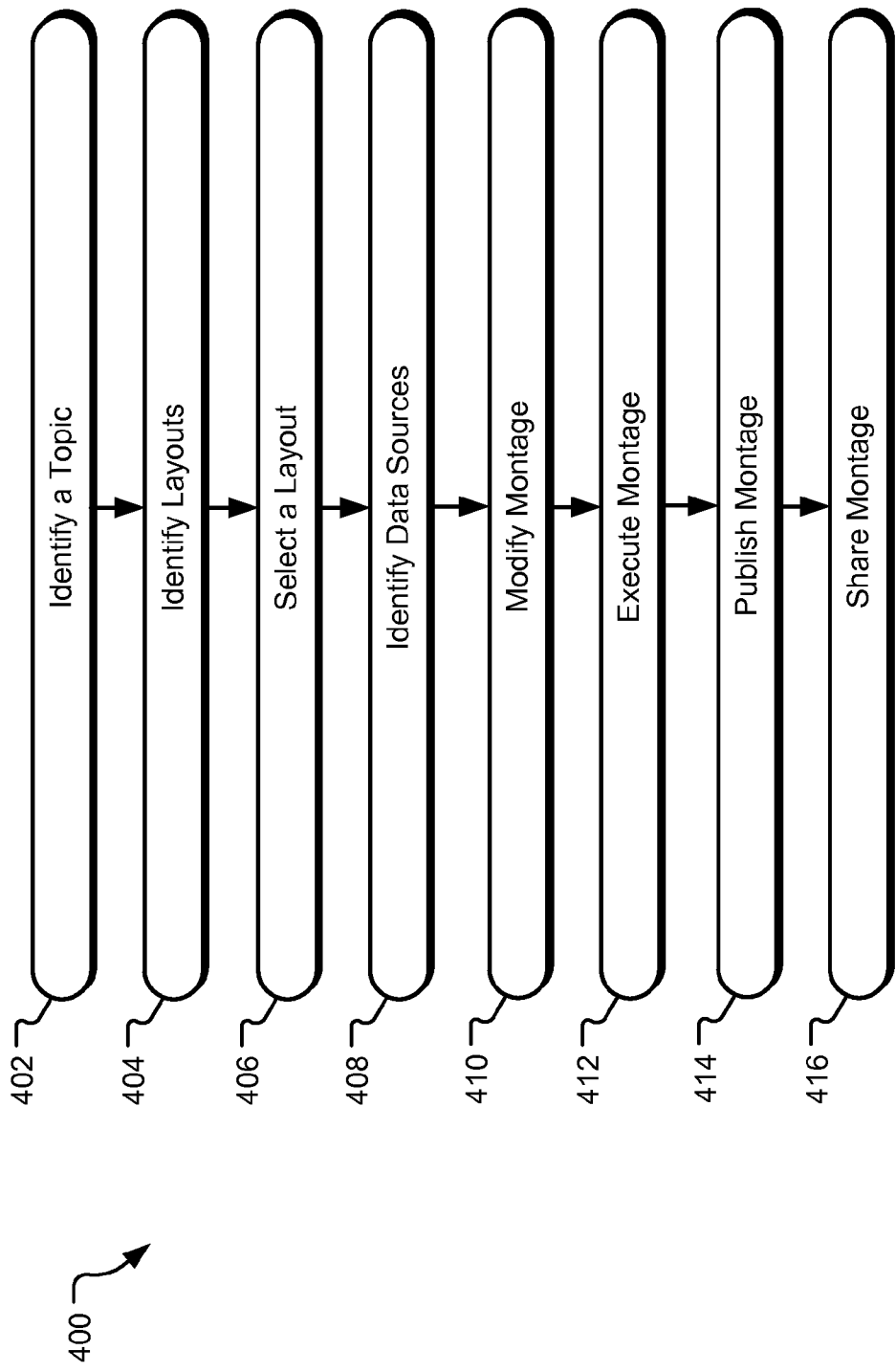
FIG. 4 illustrates example operations for dynamic digital montage creation.

FIG. 4 illustrates example operations 400 for dynamic digital montage creation. In one implementation, a montage server engine communicatively connected to a communication network performs one or more of the operations 400. In an alternative implementation, a client engine located on a user device, such as a desktop computer, a smart-phone, etc., performs one or more such operations. Alternatively, some of the operations are performed by the server engine and other operations are performed by a client engine. Each of the server engine and the client engine can receive one or more inputs from a user who is creating a montage or from a group of users, such as the members of the user's social network.

An identification operation 402 identifies the topic of the montage to be created. In one implementation, the topic of the montage is received from a user via a search request. A user provides such a search request via a popular search engine, via a smart phone, etc. Alternatively, a user visits a dedicated website that hosts montages and provides the topic information via an input box. The identification operation 402 identifies a specific topic for a montage based on the topic received from the user. In one implementation, the topic identified by the identification operation 402 is not the same as that provided by the user. For example, if a user inputs the phrase "Japan Earthquake," as a search request, the identification operation 402 analyzes the phrase based on user information, context, etc. to identify the topic as "Japan Earthquake 2011." Alternatively, the identification operation 402 uses the exact search term as provided by the user. For example, the identification operation 402 will identify the topic "Japan Earthquake" as all earthquakes in Japan. In yet another alternative, the identification operation 402 suggests one or more alternative topics based on the search term.

Subsequently, an identification operation 404 identifies one or more layouts for creating a montage. The identification operation 404 uses information about the user requesting the montage, layouts of existing popular montages, layouts used by the members of the user's social network, etc. in identifying one or more layouts for creating a montage. In one implementation, the identification operation 404 analyzes the layouts stored on a single server engine and their rankings. However, in an alternative implementation, the identification operation 404 undertakes a search over a communication network to identify the up-to-date ranking of various montage layouts. In yet another implementation, the identification operation 404 asks the user to provide information about one or more user preferences before identifying montage layouts. For example, the identification operation 404 asks the user whether the user is interested in making a montage that uses a lot of rich media, whether the user is interested in making a montage that is compliant with the wireless application protocol (WAP), etc. before identifying the montage layouts.

A selecting operation 406 selects one of the one or more layouts identified by the identification operation 404. The selection operation 406 receives input from the user in selecting the layout. In one implementation, it is the user creating a montage that selects the montage layout and provides such selection to the selecting operation 406. In an alternative implementation, the selecting operation 406 automatically selects a montage layout based on one or more preferences identified by the user creating a montage. The selecting operation 406 also identifies other montage parameters, such as the background image of the selected montage, any logo to be used as a background of the montage, etc.

Subsequently, an identification operation 408 identifies one or more data sources related to the one or more montage components in the selected montage layout. For example, if a selected layout includes a montage component for photographs, the identification operation 408 identifies the sources to be used for populating such a montage component. In one implementation, the identification operation 408 recommends a list of possible data sources for one or more of the montage components and allows the user to select from among the recommended sources. Alternatively, a user ranks the recommended data sources to be used with one or more of the montage components.

A modifying operation 410 edits the selected montage by modifying one or more of the layout of the selected montage, the montage components included in the selected montage, one or more data sources, and other parameters, such as background, resolution, etc., of the selected montage. For example, once a montage is selected, the modifying operation 410 modifies a size and/or placement of a montage component based on an input from the user, where size and placement define a section of the montage occupied by the montage component's display.

Subsequently, an executing operation 412 executes the montage. In one implementation, the executing operation 412 executes one or more of the montage components or any other executable code attached to the modified montage. Thus, for example, if the modified montage has a montage component that shows static pages about the montage topic from a newspaper website, the executing operation refreshes the static montage component to be populated with information from the newspaper website. As a result, the user creating the montage is able to view the actual montage as it would look like when it is published.

A publishing operation 414 publishes the montage. In one implementation, the publishing operation 414 records a particular montage to a tangible computer readable storage medium (e.g., as a self-contained blob (binary large object of HTML, JavaScript, etc.) and publishes the recorded montage after the user creating that particular montage has given the publishing operation 414 permission to do so. The publishing operation 414 publishes the montage on a dedicated website where a number of other montages are published. In an alternative implementation, publishing operation 414 also publishes the montage on one or more websites as identified by the user creating the montage. Publication may copy the recorded montage to another location or may transmit a reference to the recorded montage, allowing in both cases another user to access the montage.

However, in an alternative implementation, the user creating the montage only selects sharing the montage (a type of limited publication). In such implementation, a sharing operation 416 records a particular montage to a tangible computer readable storage medium (e.g., as a self-contained blob (binary large object of HTML, JavaScript, etc.) and shares the recorded montage to recipients specified by the user. For example, the user specifies that the montage is shared with his group of professional contacts only, in which case, a link to the montage is e-mailed to the identified group. In such an implementation, even if the montage is published on a dedicated website for montages, only members of the identified group have access to the montage and only through the link provided in the e-mail. Alternatively, the user creating the montage allows the sharing operation 416 to share the montage with the user's friends on a particular social network, in which case a link is added to the home page of the user on that particular social network. Sharing is a type of limited publication and may employ copying of the recorded montage to another location or transmission of a reference to the recorded montage, allowing in both cases a designated user to access the montage.

It should be understood that publication operation 414 and the sharing operation 416 may be executed in parallel, in reverse order to that shown in FIG. 4, or in the alternative (e.g., publishing without sharing or vice versa).

Furthermore, montages may be integrated into a search engine. For example, a user may create a montage on a trending topic and save it (or a reference thereto) to a search engine for indexing. As a result of this indexed saving operation, the search engine may return the montage (or a reference thereto) as part of its search results. In one perspective, such facility provides a search result that is itself dynamic, self-contained, and continually updating based on refreshed data received from one or more dynamic data sources.

Figure 5:
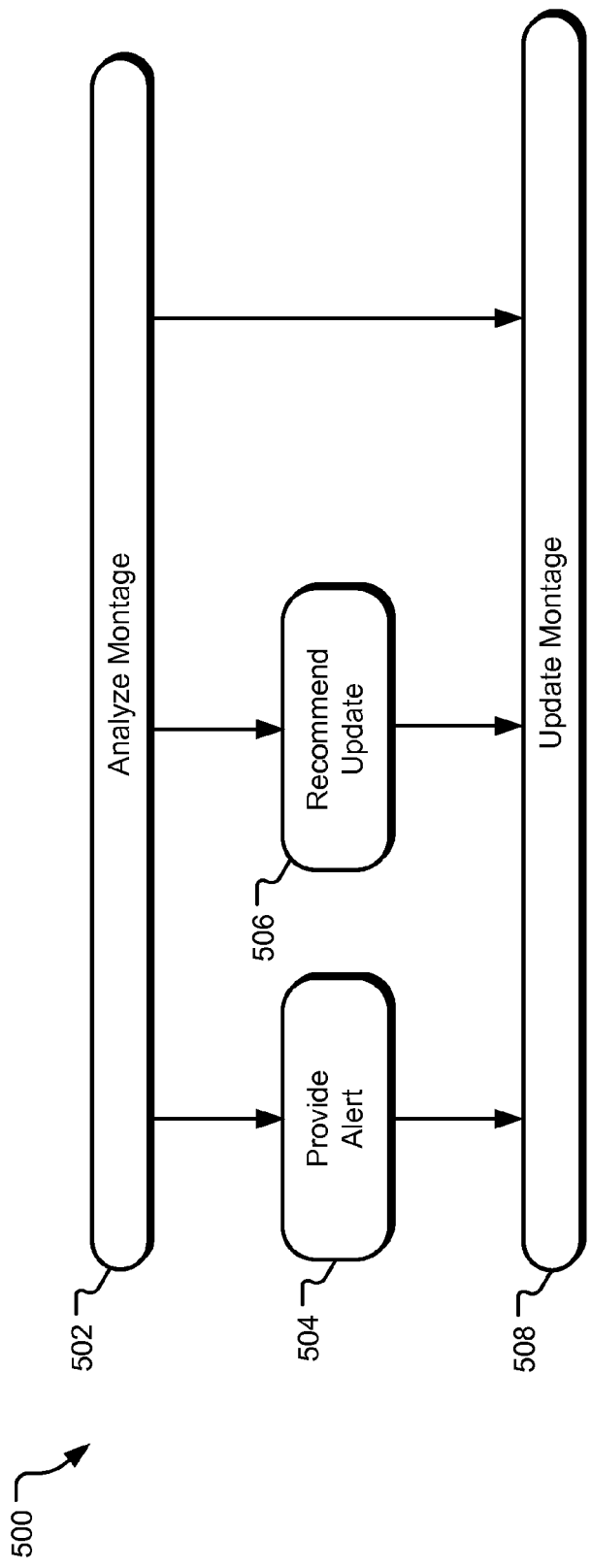
FIG. 5 illustrates example operations for dynamic digital montage analysis and revision.

FIG. 5 illustrates example operations 500 for dynamic digital montage revision. An analysis operation 502 analyzes the features of the montage to improve the effectiveness of the montage. In one implementation, the analysis operation 502 analyzes the montage periodically at predetermined intervals. Alternatively, a user creating a montage requests an analysis of the montage. The scope of the montage analysis performed by the analysis operation 502 varies based on a number of factors, such as the time of analysis, the nature of request received from user, etc. A robust analysis of a montage may include, for example, analysis of the montage layout, montage parameters such as the background color, data sources attached to various montage components in a montage, etc.

For example, the analysis operation 502 analyzes the updated popularity ranking of the montage layout based on updated traffic data, updated visitor input, etc. Thus, the analysis operation 502 may determine that montages related to politics having a blue background color are more popular than those having red background color. Alternatively, analysis of the layout of various montages may show that montages having a comments montage component on the right side of the montage get more user participation than those with comment montage component on the left side of the montage.

The analysis operation 502 may also analyze the data sources on a periodic basis. For example, the analysis of the data sources attached to various montage components in a montage identifies that a particular data source is generating more up-to-date information than the other. Similarly, for a montage related to conflict in the Middle East, the analysis operation 502 identifies that using one news network as the data source results in more updates compared to using another news network as the data source. Alternatively, the analysis may find that for a particular montage component the terms of search need to be changed to keep the results presented in that montage component more current. Thus, for example, a static news montage component that was designed to give information about Academy awards may not generate enough results a few months after latest Academy awards pageant, and therefore, the search term for such as montage component should be changed to get information about new Hollywood movies, thereby improving the currency of the information presented by the montage.

Based on the results of the analysis engine, an alert operation 504 generates an alert to the user that created the montage. In one implementation, such an alert does not have any recommendation and just notifies the user of the result of the analysis. For example, an alert generated by the alert operation 504 notifies the user that there has been no visitor to the montage for the last week, or that the comment montage component has not been used by any visitor for the last month, etc.

Alternatively, a recommendation operation 506 generates a recommendation using the results of the analysis operation 502. Thus, for example, based on an analysis of a data source for a montage related to "natural disasters," the recommendation operation 506 generates a recommendation to change the topic of the montage to "tsunami."

In response to the alert operation 504 or the recommendation operation 506, an update operation 508 updates the montage. Updating the montage includes without limitation updating the layout of the montage, updating or removing one or more montage components, updating data sources attached to the montage, etc. For example, in response to an alert regarding lack of visitors to a montage, a user decides to change the layout by removing the comments montage component, change the montage topic, republish the montage, etc. In such a case, the user provides appropriate instructions and/or approvals for such changes.

Alternatively, the update operation 508 automatically updates the montage directly in response to the analysis operation 502. Thus, for example, if the analysis operation 502 determines that the amount of advertising revenue generated by a montage is declining, then in response to such analysis, the update operation 508 automatically changes one or more parameters and/or the layout of the montage.

Figure 6:
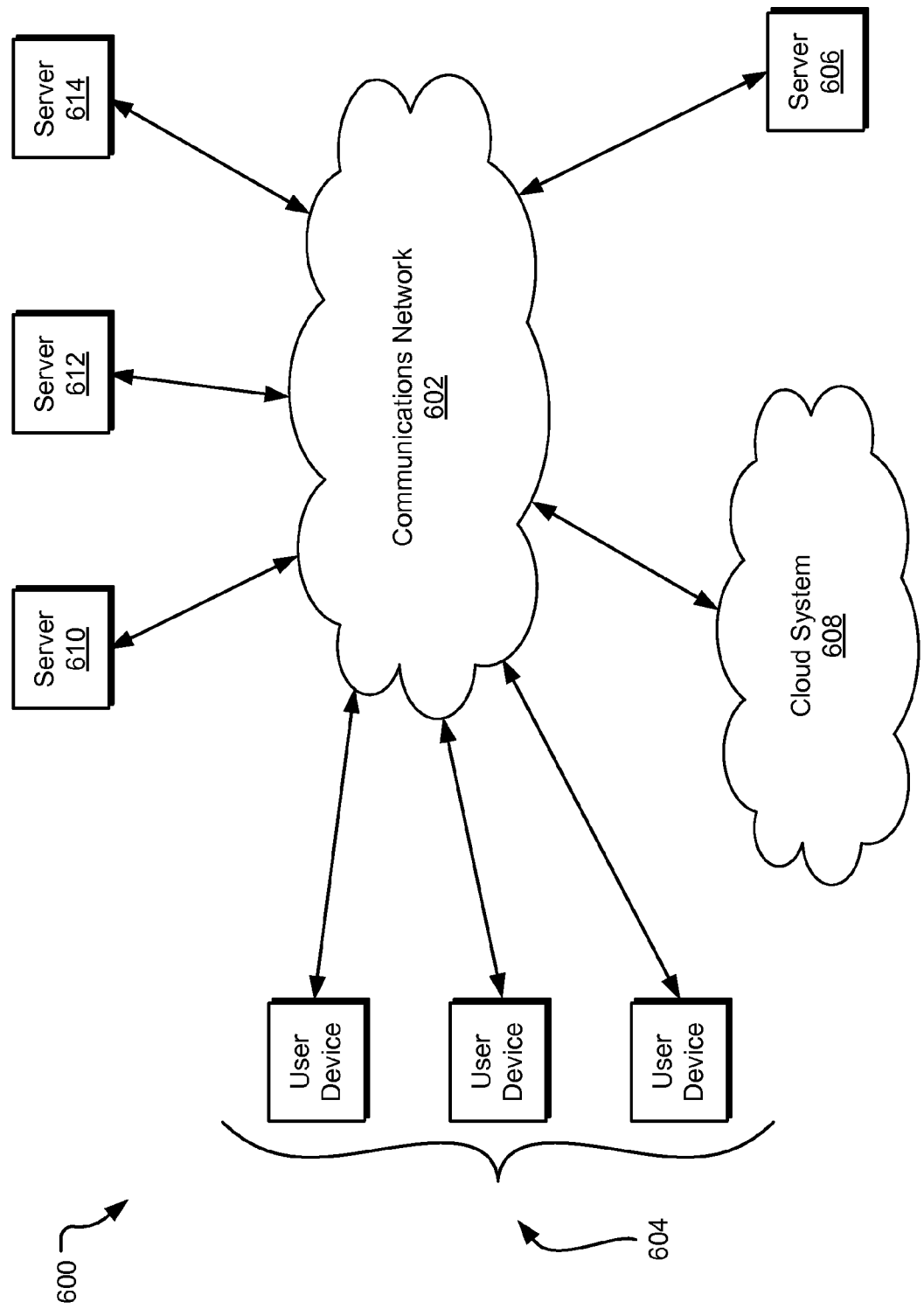
FIG. 6 illustrates an example network environment for implementing a dynamic digital montage system.

FIG. 6 illustrates an example network environment 600 for implementing a dynamic digital montage system. Specifically, FIG. 6 illustrates the communications network 602 (e.g., the Internet) that is used by one or more computing or data storage resources for implementing a dynamic digital montage system. In one implementation, one or more user devices 604 are communicatively connected to the Internet 602. The user devices 604 include a personal computer, a laptop, a smart-phone, etc. A user interested in creating, modifying, or visiting a montage uses such user devices 604 to access one or more montages, a dynamic digital montage system, a montage revision system, a montage modification system, etc.

A server 606 hosts a dynamic digital montage system. In an alternative implementation, the server 606 also hosts a website that users visit to view one or more montages. Alternatively, a cloud system 608 hosts one or more of the montages, the dynamic digital montage system, the montage modification system, etc. The user devices 604, the server 606, the cloud system 608, as well as other resources connected to the Internet 602 access servers 610, 612, and 614 for getting access to various websites, user e-mails, blogs, micro-blogs, social networks, etc. In one implementation, the server 610 hosts a search engine that is accessed by a user using one of the user devices 604. In response to such a search request, the search engine generates a Web page including, among other things, a link to the dynamic digital montage system hosted on server 606. A user can access the dynamic digital montage system by selecting such a link.

Figure 7:
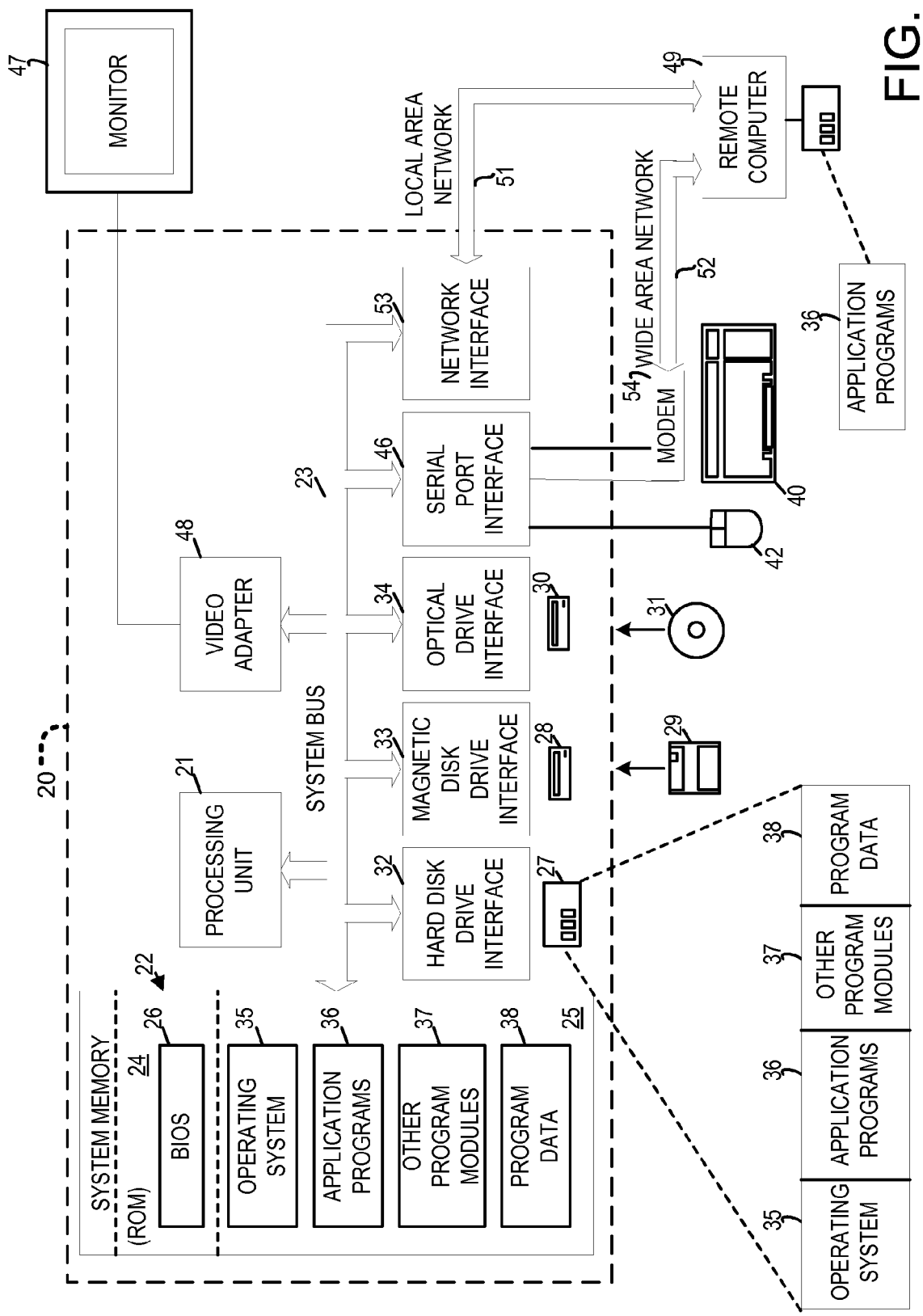
FIG. 7 illustrates an example system that may be useful in implementing the technology described herein.

FIG. 7 illustrates an example system that may be useful in implementing the described technology. The example hardware and operating environment of FIG. 7 for implementing the described technology includes a computing device, such as general purpose computing device in the form of a gaming console or computer 20, a mobile telephone, a personal data assistant (PDA), a set top box, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program engines and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program engines may be stored on the hard disk, magnetic disk 29, optical disk 31, ROM 24, or RAM 25, including an operating system 35, one or more application programs 36, other program engines 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 7. The logical connections depicted in FIG. 7 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of and communications devices for establishing a communications link between the computers may be used.

In an example implementation, a dynamic digital montage environment or system, a gallery engine, an editor engine, a publishing engine, and other engines and services may be embodied by instructions stored in memory 22 and/or storage devices 29 or 31 and processed by the processing unit 21. A data from dynamic and static data sources, predefined montage templates, predefined montages, images, videos, tweets, and other data may be stored in memory 22 and/or storage devices 29 or 31 as persistent datastores. Further, a forwarding service and an ad service represent hardware and/or software configured to provide service functionality for network-connected systems. Such services may be implemented using a general purpose computer and specialized software (such as a server executing service software), a special purpose computing system and specialized software (such as a mobile device or network appliance executing service software), or other computing configurations.

The embodiments of the invention described herein are implemented as logical steps in one or more computer systems. The logical operations of the present invention are implemented (1) as a sequence of processor-implemented steps executing in one or more computer systems and (2) as interconnected machine or circuit engines within one or more computer systems. The implementation is a matter of choice, dependent on the performance requirements of the computer system implementing the invention. Accordingly, the logical operations making up the embodiments of the invention described herein are referred to variously as operations, steps, objects, or engines. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method implemented by a computing system, the method comprising:
saving authoring information for a layout of a montage, wherein the authoring information is based on at least one user input from a first user, the at least one user input defining a first location in the layout for a first montage component and a second location in the layout for a second montage component;
responsive to at least another user input from the first user, identifying a first data source to connect to the first montage component and a second data source to connect to the second montage component;
configuring the first montage component to display first data from the first data source and the second montage component to display second data from the second data source;
receiving, through a communications network, a first data stream from the first data source and a second data stream from the second data source;
analyzing displayable features of the montage to determine popularity information of the montage layout; and
providing an editing recommendation to the user regarding a recommended change to the montage layout for improving popularity of the montage based on the analyzing.

2. The method of claim 1, further comprising editing the displayable features of the montage based on the editing recommendation responsive to receiving a confirmation of the editing recommendation from the first user.

3. The method of claim 1, further comprising:
analyzing the first data source and other data sources to determine a data source recommendation for improving currency of dynamic data displayed in the montage; and
identifying an updated data source from the first data source and other data sources to connect to the first montage component based on the data source recommendation.

4. The method of claim 1, further comprising:
receiving, at a search engine, a search query pertaining to a topic of interest; and
responsive to the receiving the search query, transmitting a reference to the montage as a search result provided by the search engine.

5. The method of claim 1, wherein the identifying the first data source for the first montage component further comprises identifying the first data source as a result of at least one search topic provided by the first user.

6. The method of claim 1, further comprising tracking popularity information of the layout of the montage and influencing a popularity ranking of the layout of the montage using the popularity information.

7. The method of claim 1, further comprising:
publishing the montage that is based on the montage layout; and
sharing the authoring information for the layout with one or more second users, wherein the shared authoring information is used by the one or more second users to create additional montages based on the layout.

8. The method of claim 1, wherein:
the at least one user input comprises an edit command entered by the first user, wherein the edit command identifies at least one change to one or more montage template components in a montage template authored by a different user; and
the method further comprises, responsive to the receiving the edit command, editing the one or more montage template components to define the layout of the montage.

9. The method of claim 1, further comprising:
receiving different input from the one or more second users;
creating the additional montages based on the layout and based on the different input received from the one or more second users; and
publishing the additional montages for access by others.

10. One or more tangible computer-readable storage media storing computer-executable instructions which, when executed by a computing system, cause the computing system to perform a computer process comprising:

defining an assembly of user-editable montage components to create a layout of a montage, the user-editable montage components being configured to occupy specified sections of the layout of the montage and to display data from specified data sources including a dynamic data source and a static data source, wherein the dynamic data source is associated with a first user-editable montage component and the static data source is associated with a second user-editable montage component;

displaying the user-editable montage components in the montage through a graphical user interface, the displaying comprising presenting the first user-editable montage component in a first specified section of the layout of the montage specified for the first user-editable montage component, and presenting the second user-editable montage component in a second specified section of the layout of the montage specified for the second user-editable montage component;

refreshing dynamic data displayed within the first user-editable montage component associated with the dynamic data source responsive to receipt of updated data in a data stream from the dynamic data source;

analyzing displayable features of the montage to determine popularity information of the layout of the montage; and providing an editing recommendation regarding a recommended change to the layout of the montage for improving a popularity ranking of the montage based on the analysis.

11. The one or more tangible computer-readable storage media of claim 10, wherein the computer process further comprises, editing the displayable features of the montage based on the editing recommendation responsive to receiving a confirmation of the editing recommendation.

12. The one or more tangible computer-readable storage media of claim 10, wherein the computer process further comprises:

analyzing the specified data sources to determine a data source recommendation for improving currency of the dynamic data displayed in the montage; and automatically editing at least one of the specified data sources based on the data source recommendation without user confirmation.

13. The one or more tangible computer-readable storage media of claim 10, wherein the computer process further comprises:

receiving a search query pertaining to a topic of interest; and responsive to the receiving the search query, transmitting a reference to the montage as a search result provided by a search engine.

14. The one or more tangible computer-readable storage media of claim 10, wherein the dynamic data source associated with the first user-editable montage component is identified as a result of a search query based on at least one search topic received through the graphical user interface.

15. The one or more tangible computer-readable storage media of claim 10, wherein the popularity information includes a number of authors that have chosen the layout of the montage.

16. The one or more tangible computer-readable storage media of claim 10, wherein the computer process further comprises:

publishing the montage for access by multiple different users.

17. The one or more tangible computer-readable storage media of claim 10, wherein the defining the assembly of user-editable montage components comprises:

receiving an edit command entered by a user, wherein the edit command identifies at least one change to one or more montage template components in a montage template authored by a different user; and responsive to the receiving the edit command, editing the one or more montage template components to define the assembly of user-editable montage components.

18. The one or more tangible computer-readable storage media of claim 10, wherein at least one of the user-editable montage components is an advertising montage component configured to display an advertisement and selection of the advertising montage component directs advertising revenue associated with the advertising montage component to one or more authors in an attribution tree associated with the montage.

19. A system comprising:

one or more processing devices; and one or more computer-readable storage devices storing instructions which, when executed by one or more processing devices, cause the one or more processing devices to:

save authoring information of a layout of a montage based on input from a first user;

share the authoring information with one or more second users, wherein the shared authoring information is used by the one or more second users to create additional montages based on the layout;

define an assembly of user-editable montage components in the montage based on the layout, wherein a first individual user-editable montage component is configured to display first data from a first specified data source;

display the first individual user-editable montage component in a first section of the montage specified for the first individual user-editable montage component;

display updated data within the first individual user-editable montage component responsive to receipt of updated data from a first specified data source;

analyze displayable features of the montage to determine popularity information of the layout of the montage; and provide an editing recommendation identifying a recommended change to the layout of the montage for improving a popularity ranking of the montage based on the analysis.

20. The system of claim 19, wherein the executed instructions further cause the one or more processing devices to record the montage to one or more tangible storage media and publish the recorded montage for access by other users.

21. The system of claim 19, wherein the executed instructions further cause the one or more processing devices to create the additional montages based on the layout, wherein the user-editable montage components of the additional montages are configured to display additional data from additional specified data sources identified by the one or more second users.

* * * * *